(12) United States Patent  
Wren et al.

(10) Patent No.: US 8,412,512 B1
(45) Date of Patent: Apr. 2, 2013

(54) FEED TRANSLATION FOR A SOCIAL NETWORK

(75) Inventors: Christopher R. Wren, Arlington, MA (US); Nadav Aharony, Cambridge, MA (US)

(73) Assignee: Google Inc., Mountain View, CA (US)

( * ) Notice: Subject to any disclaimer, the term of this patent is extended or adjusted under 35 U.S.C. 154(b) by 17 days.

(21) Appl. No.: 13/245,813

(22) Filed: Sep. 26, 2011

Related U.S. Application Data

(63) Continuation of application No. 13/231,270, filed on Sep. 13, 2011.

(60) Provisional application No. 61/488,400, filed on May 20, 2011.

(51) Int. Cl.
*G06F 17/28* (2006.01)

(52) U.S. Cl. ............. 704/3; 704/2; 704/4; 704/5; 704/6; 704/7; 704/8; 704/9

(58) Field of Classification Search .................. 704/277, 704/1–10
See application file for complete search history.

(56) References Cited

U.S. PATENT DOCUMENTS

| | | | | |
|---|---|---|---|---|
| 5,062,143 | A | * | 10/1991 | Schmitt .......................... 382/230 |
| 5,828,990 | A | * | 10/1998 | Nishino et al. .................... 704/2 |
| 5,848,386 | A | * | 12/1998 | Motoyama ........................ 704/5 |
| 5,987,401 | A | * | 11/1999 | Trudeau ............................ 704/2 |
| 6,130,938 | A | | 10/2000 | Erb |
| 6,161,082 | A | * | 12/2000 | Goldberg et al. ................. 704/3 |
| 6,192,119 | B1 | | 2/2001 | Wilson |
| 6,697,478 | B1 | | 2/2004 | Meldrum et al. |
| 6,754,322 | B1 | | 6/2004 | Bushnell |
| 7,106,848 | B1 | | 9/2006 | Barlow et al. |
| 7,366,990 | B2 | | 4/2008 | Pitroda |
| 7,555,110 | B2 | | 6/2009 | Dolan et al. |
| 7,610,287 | B1 | | 10/2009 | Dean et al. |
| 7,627,479 | B2 | * | 12/2009 | Travieso et al. .............. 704/277 |
| 7,684,548 | B1 | * | 3/2010 | Rodkey et al. ............. 379/88.12 |

(Continued)

FOREIGN PATENT DOCUMENTS

| | | |
|---|---|---|
| JP | 6068144 | 11/1994 |
| WO | WO02079984 | 10/2002 |

OTHER PUBLICATIONS

Adamic et al., "A Social Network Caught in the Web," Internet Journal, First Monday, Jun. 2, 2003, pp. 1-22, vol. 8, No. 6.

(Continued)

*Primary Examiner* — Pierre-Louis Desir
*Assistant Examiner* — Fariba Sirjani
(74) *Attorney, Agent, or Firm* — Patent Law Works LLP

(57) ABSTRACT

A system and method for translating a social feed is disclosed. The system comprises a communication module, a decoding engine and a re-encoding engine. The communication module receives social feed data and a request from a social network application. The social feed data is configured to cause a client to display a social feed in a first language. The request includes data indicating that the social feed should be displayed in a second language. The decoding engine decodes the social feed data to generate decoded social feed data. The re-encoding engine re-encodes the decoded social feed data to cause the client to display the social feed in the second language based at least in part on the request. The communication module sends the translated social feed data to the client.

26 Claims, 5 Drawing Sheets

U.S. PATENT DOCUMENTS

| | | | |
|---|---|---|---|
| 7,742,468 B2 | 6/2010 | Vagelos | |
| 7,801,720 B2 * | 9/2010 | Satake et al. | 704/4 |
| 7,822,596 B2 * | 10/2010 | Elgazzar et al. | 704/2 |
| 7,849,144 B2 * | 12/2010 | Prajapat et al. | 709/206 |
| 7,904,291 B2 * | 3/2011 | Kamatani et al. | 704/2 |
| 7,983,902 B2 | 7/2011 | Wu et al. | |
| 8,073,678 B2 * | 12/2011 | Masuichi et al. | 704/5 |
| 8,135,574 B2 * | 3/2012 | Weikel | 704/3 |
| 8,145,473 B2 * | 3/2012 | Anisimovich et al. | 704/4 |
| 8,145,678 B2 * | 3/2012 | Ramsay et al. | 707/802 |
| 8,271,260 B2 * | 9/2012 | Wong et al. | 704/2 |
| 2002/0137490 A1 | 9/2002 | Gallant | |
| 2002/0143874 A1 | 10/2002 | Marquette et al. | |
| 2004/0068411 A1 * | 4/2004 | Scanlan | 704/277 |
| 2004/0111271 A1 * | 6/2004 | Tischer | 704/277 |
| 2004/0158471 A1 * | 8/2004 | Davis et al. | 704/277 |
| 2004/0258220 A1 | 12/2004 | Levine et al. | |
| 2005/0010419 A1 | 1/2005 | Pourhamid | |
| 2005/0152521 A1 | 7/2005 | Liljestrand | |
| 2005/0234851 A1 * | 10/2005 | King et al. | 707/1 |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |
| 2006/0259957 A1 * | 11/2006 | Tam et al. | 726/3 |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2008/0056475 A1 | 3/2008 | Brannick et al. | |
| 2008/0103879 A1 | 5/2008 | Armstrong | |
| 2008/0192656 A1 | 8/2008 | Vagelos | |
| 2008/0229215 A1 * | 9/2008 | Baron et al. | 715/751 |
| 2008/0243472 A1 * | 10/2008 | DeGroot et al. | 704/2 |
| 2008/0243607 A1 | 10/2008 | Rohan et al. | |
| 2008/0243780 A1 | 10/2008 | Nance et al. | |
| 2008/0275899 A1 | 11/2008 | Baluja et al. | |
| 2008/0313534 A1 * | 12/2008 | Cheung et al. | 715/254 |
| 2009/0024595 A1 | 1/2009 | Chen | |
| 2009/0070219 A1 * | 3/2009 | D'Angelo et al. | 705/14 |
| 2009/0094048 A1 * | 4/2009 | Wallace et al. | 705/1 |
| 2009/0198487 A1 * | 8/2009 | Wong et al. | 704/4 |
| 2009/0198711 A1 | 8/2009 | Datar et al. | |
| 2009/0228281 A1 * | 9/2009 | Singleton et al. | 704/275 |
| 2009/0234633 A1 * | 9/2009 | Chao-Suren et al. | 704/2 |
| 2009/0248392 A1 | 10/2009 | Talwar et al. | |
| 2009/0274299 A1 * | 11/2009 | Caskey et al. | 380/255 |
| 2010/0114887 A1 * | 5/2010 | Conway et al. | 707/737 |
| 2010/0223048 A1 * | 9/2010 | Lauder | 704/4 |
| 2010/0241417 A1 * | 9/2010 | Bassett et al. | 704/8 |
| 2010/0299138 A1 * | 11/2010 | Kim | 704/9 |
| 2010/0299600 A1 * | 11/2010 | Archer et al. | 715/716 |
| 2011/0010162 A1 | 1/2011 | Elgazzar et al. | |
| 2011/0035207 A1 * | 2/2011 | Abe | 704/2 |
| 2011/0077934 A1 * | 3/2011 | Kanevsky et al. | 704/3 |
| 2011/0087480 A1 * | 4/2011 | Neeley | 704/3 |
| 2011/0098156 A1 | 4/2011 | Ng et al. | |
| 2011/0122448 A1 * | 5/2011 | Minhas | 358/1.18 |
| 2011/0125485 A1 * | 5/2011 | Prakash et al. | 704/3 |
| 2011/0125486 A1 * | 5/2011 | Jaiswal | 704/3 |
| 2011/0125550 A1 * | 5/2011 | Erhart et al. | 705/7.29 |
| 2011/0125793 A1 * | 5/2011 | Erhart et al. | 707/776 |
| 2011/0137856 A1 * | 6/2011 | Jana et al. | 707/609 |
| 2011/0138171 A1 * | 6/2011 | Yildiz | 713/153 |
| 2011/0282645 A1 * | 11/2011 | Khuda | 704/3 |
| 2011/0282648 A1 * | 11/2011 | Sarikaya et al. | 704/7 |
| 2011/0307241 A1 * | 12/2011 | Waibel et al. | 704/2 |
| 2012/0035905 A1 * | 2/2012 | Brun | 704/2 |
| 2012/0109631 A1 * | 5/2012 | Gopal et al. | 704/3 |
| 2012/0136943 A1 * | 5/2012 | Paul et al. | 709/206 |
| 2012/0179448 A1 * | 7/2012 | Gupta et al. | 704/2 |
| 2012/0179449 A1 * | 7/2012 | Raskino et al. | 704/2 |
| 2012/0191445 A1 * | 7/2012 | Markman et al. | 704/2 |
| 2012/0209588 A1 * | 8/2012 | Wu | 704/3 |
| 2012/0209589 A1 * | 8/2012 | Baek et al. | 704/3 |
| 2012/0253789 A1 * | 10/2012 | Heck et al. | 704/9 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, pp. 252-255, London, United Kingdom.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Google Chrome Help Forum, Google Translate in Right Click Menu, retrieved at http://www.google.com/supportlforum/p/Chrome/thread?tid=144717d9c78bb0d4&hl=en, Mar. 7, 2012, 6 pgs.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 11, 2004, 22 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twigger, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

International Search Report and Written Opinion of International Searching Authority for PCT Application PCT/US2012/038845 dated Jul. 26, 2012, 9 pages.

Vaughan-Nichols, S. J., Technology News—Statistical Language Approach Translates into Success, Computer, IEEE Service Center, dated Nov. 1, 2003, pp. 14-16, vol. 36, No. 11, Alamitos, CA US.

\* cited by examiner

FEED TRANSLATION FOR A SOCIAL NETWORK

CROSS REFERENCE TO RELATED APPLICATIONS

This application is a continuation of U.S. application Ser. No. 13/231,270, entitled "Feed Translation for a Social Network," filed Sep. 13, 2011, which claims priority under 35 USC §. 119(e) to U.S. Application No. 61/488,400, entitled "Feed Translation for a Social Network," filed May 20, 2011, the entirety of each of which is herein incorporated by reference.

BACKGROUND

The specification relates to a system and method for machine translation. In particular, the specification relates to translating a feed for a social network.

Social network applications are growing in popularity. These services appeal to millions of people all over the world. Collectively, these users communicate in many different languages.

Users access the social network application using a browser or a thin-client application stored on a client device. The social network application provides the user with a social feed that is displayed by the client. This feed includes content such as user updates, comments and other content common to social networks. Frequently this feed will include content in languages that are not used by the user. For example, the user speaks the Spanish language but the content is displayed in the English language. The user desires to have the content translated from the English language to the Spanish language. Existing translation solutions have numerous problems.

First, existing solutions require all the content in a social feed to be translated. However, users frequently only want a portion of the social feed to be translated. Second, existing solutions cannot translate content in the social feed based off of inferences regarding the user's preferred language. Existing translation solutions have numerous other problems.

SUMMARY OF THE INVENTION

The technology described in the specification overcomes the deficiencies and limitations of the prior art at least in part by providing a system and method for translating a feed for a social network. The system comprises a communication module, a decoding engine and a re-encoding engine. The communication module receives social feed data and a request from a social network application. The social feed data is configured to cause a client to display a social feed in a first language, for example, via a browser or a display application. The request includes data indicating that the social feed should be displayed in a second language. In one embodiment, the request includes a subset command that includes a first indication that only a portion of the social feed should be translated and a second indication of which portion of the social feed should be translated.

The decoding engine decodes the social feed data to generate decoded social feed data. The re-encoding engine re-encodes the decoded social feed data to cause the client to display the social feed in the second language based at least in part on the request. The communication module sends the translated social feed data to the client. Because the decoding and re-encoding is being performed on the server side, the specification describes an efficient and simplistic process for fast translation.

In one embodiment, a social context module receives the request and determines a social context for the translation. The social context module communicates with the re-encoding engine to cause the social feed data to be translated, which results in the client displaying the social feed in the one or more second languages based at least in part on the request and the determined social context. In another example, the social context includes determining one or more social activities of a user requesting the translation and the language used by the user in the one or more social activities. In another example, the social context includes determining one or more relations of a user requesting the translation and the language used by the one or more relations.

A graphical user interface module encodes graphical data in the translated social feed data that causes a client to generate a graphic indicating that the social feed has been translated.

The specification also includes a method for translating a social feed by receiving social feed data and a request, the social feed data configured to cause a client to display a social feed in a first language, translating the social feed so that the social feed data causes the client to display the social feed in one or more second languages based at least in part on the request and sending the translated social feed data to the client.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
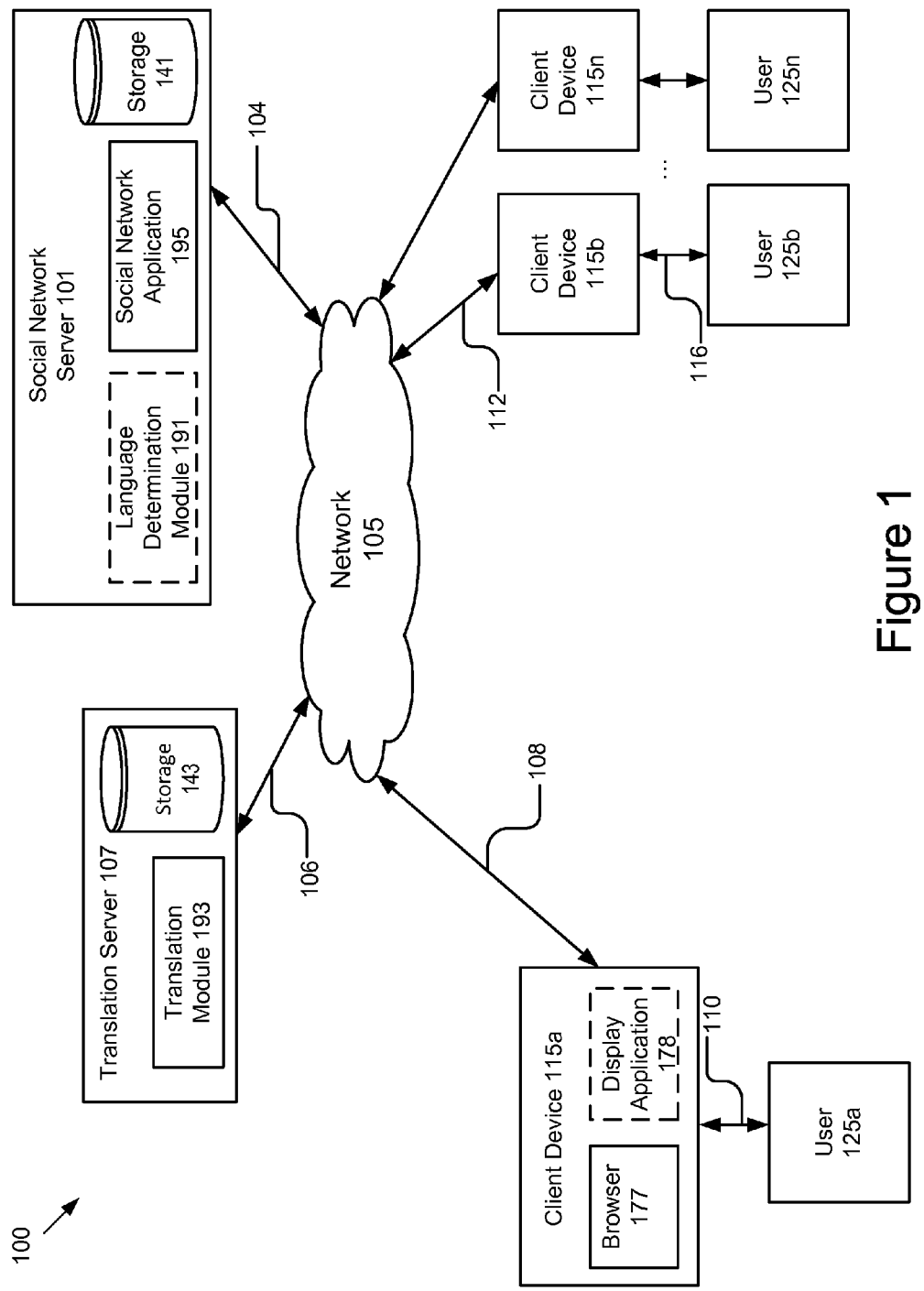
FIG. 1 is a high-level block diagram illustrating one embodiment of a system for translating a feed for a social network.

A system and method for translating a feed for a social network is described below. In the following description, for purposes of explanation, numerous specific details are set forth in order to provide a thorough understanding of the specification. It will be apparent, however, to one skilled in the art that the disclosure can be practiced without these specific details. In other instances, structures and devices are shown in block diagram form in order to avoid obscuring the disclosure. For example, the specification is described in one embodiment below with reference to user interfaces and particular hardware. However, the disclosure applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the specification. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the specification can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the disclosure as described herein.

System Overview

FIG. 1 illustrates a block diagram of a system 100 for translating a feed for a social network according to one embodiment. The system 100 includes client devices 115a, 115b, 115n that are accessed by human users 125a, 125b, 125n, a social network server 101 and a translation server 107. In one embodiment, the translation server 107 is trusted with some secure information by the social network server 101. For example, the translation server 107 is trusted with data describing a social graph by the social network server 101. In the illustrated embodiment, these entities are communicatively coupled via a network 105. Although only three client devices 115a, 115b, 115n are illustrated, persons having ordinary skill in the art will recognize that any number of client devices 115n are available to any number of users 125n. Persons having ordinary skill in the art will also appreciate that any number of users 125n can use (or access) a single client device 115n. Furthermore, while only one network 105 is coupled to the client devices 115a, 115b, 115n, the social network server 101 and the translation server 107, in practice any number of networks 105 can be connected to the social network server 101 and the translation server 107. Persons having ordinary skill in the art will also appreciate that while only one social network server 101 and one translation server 107 are depicted in FIG. 1, the system 100 could include one or more social network servers 101 and one or more translation servers 107.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. For example, the network is a 3G network or a 4G network. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

In the illustrated embodiment, the client device 115*a* is communicatively coupled to the network 105 via signal line 108. The user 125*a* interacts with the client device 115*a* as represented by signal line 110. Similarly, the client device 115*b* is coupled to the network 105 via signal line 112. Client device 115*n* and user 125*n* are coupled and interact in a similar manner. The user 125*b* interacts with the client device 115*b* as represented by signal line 116. The translation server 107 is communicatively coupled to the network 105 via signal line 106. The social network server 101 is communicatively coupled to the network 105 via signal line 104.

The social network server 101 is a hardware server device. For example, the social network server 101 is a hardware server operated by Google® of Mountain View, Calif. In one embodiment, the social network server 101 sends and receives data to and from one or more of the client devices 115*a*, 115*b*, 115*n* via the network 105. For example, the social network server 101 is a hardware server that provides one or more of the Google® Friend Connect services and the Google® Buzz services to the client devices 115*a*, 115*b*, 115*n*. A person having ordinary skill in the art will recognize that the social network server 101 can be configured to provide different services and/or functionality to the client devices 115*a*, 115*b*, 115*n*.

In one embodiment, the social network server 101 is a device that is trusted by the users 125*a*, 125*b*, 125*n* of the client devices 115*a*, 115*b*, 115*n*. For example, the users 125*a*, 125*b*, 125*n* of the client devices 115*a*, 115*b*, 115*n* share data and/or other information about the users 125*a*, 125*b*, 125*n* and/or the client devices 115*a*, 115*b*, 115*n* with the social network server 101. In one embodiment, the social network application 195 collects this information and stores it as a social graph in the storage device 141.

In one embodiment, the social network server 101 comprises, among other things, a storage device 141 and a social network application 195. In one embodiment, the social network server 101 comprises a language determination module 191. The language determination module 191 is depicted in FIG. 1 with a dashed line to indicate that it is an optional feature of the social network server 101.

The storage device 141 is a non-transitory memory that stores data such as social data about the user 125*a*, 125*b*, 125*n*. The social data describes the user's 125*a*, 125*b*, 125*n* actions on one or more social networks and/or other information about the user 125*a*, 125*b*, 125*n* (e.g., the user's 125*a*, 125*b*, 125*n* gender, age, education, past and present employers, geographic location, family members, friends and the actions of the user's 125*a*, 125*b*, 125*n* friends and family members on one or more social networks). In one embodiment, the social data can also include the user's 125*a*, 125*b*, 125*n* comments on updates by other users 125*a*, 125*b*, 125*n*. In another embodiment, the social data can be stored as a social graph in the storage device 141. In yet another embodiment, the social network server 101 additionally comprises one or more of a processor (not pictured), a clock (not pictured) used to generate timestamps for user comments and other components conventional to a hardware server device. In one embodiment, the storage device 141 stores the Internet Protocol address ("IP address") for one or more of the clients 115*a*, 115*b*, 115*n*.

The social network application 195 is code and routines stored on a memory (not pictured) of the social network server 101 that, when executed by a processor (not pictured) of the social network server 101, causes the social network server 101 to provide a social network accessible by a client device 115*a*, 115*b*, 115*n* via the network 105. A social network is any type of social structure where the users are connected by a common feature, for example, Google Plus. The common feature includes friendship, family, work, an interest, etc. The common features are provided by one or more social networking systems, such as those included in the system 100, including explicitly-defined relationships and relationships implied by social connections with other online users, where the relationships form a social graph. In some examples, the social graph reflects a mapping of these users and how they are related or connected. In one embodiment, a user 125*a*, 125*b*, 125*n* publishes comments on the social network and this information is stored in the social graph. For example, a user 125*a*, 125*b*, 125*n* of the social network application 195 provides a status update and other users 125*a*, 125*b*, 125*n* can make a comment on the status update. The status update and the comment are stored by the social network application 195 as part of the social graph in the storage device 141.

The social network application 195 is communicatively coupled to the client devices 115*a*, 115*b*, 115*n* via the network 105. The social network application 195 delivers social network content to the client device 115*a*, 115*b*, 115*n*. For example, the client device 115*a*, 115*b*, 115*n* requests social network content from the social network application 195 and the social network application 195 provides social feed data to the client device 115*a*, 115*b*, 115*n*. The social feed data is the information necessary to cause the client device 115*a*, 115*b*, 115*n* to expose a Graphical User Interface ("GUI") of a social feed to the user 125*a*, 125*b*, 125*n*. The social data stored on the storage device 141 (e.g., the social graph) includes the social feed data. The GUI depicts the social feed. The social feed is a data feed that includes at least a portion of the social data stored on the storage device 141. For example, the social feed includes a description of activities performed by one or more users on the social network represented by the social network application 195. In one embodiment, the storage device 141 stores all or a subset of the social data used to generate the social feed.

An activity is an action taken on the social network. Examples of the activity include: providing a status update; making a comment on a status update; establishing a friendship association; editing profile information; and/or managing privacy settings, etc. In one embodiment, an activity performed by a user is associated with a user input. For example, a first user 125*a* uses an input peripheral (e.g., a keyboard) and a browser 177 or a display application 178 stored on the first client device 115*a* to perform an activity on the social network.

In one embodiment, the social feed includes a description of all onsite activities one or more users 125*a*, 125*b*, 125*n* have performed on the social network. In one embodiment, the social network application 195 only collects this information with the user's permission and uses any collected information in accordance with the permission given by a user.

The language determination module 191 is code and routines stored on a memory (not pictured) of the social network server 101 that, when executed by a processor (not pictured) of the social network server 101, causes the social network server 101 to translate the social feed from a first language to a second language. In one embodiment, the language determination module 191 identifies the language based on the language itself. For example, a first user 125*a* has a friendship relationship stored in the social graph connecting the first user 125*a* to a second user 125*b*. The first user 125*a* communicates using the English language. The second user 125*a* communicates using the Italian language. The second user 125*b* provides a status update to the social network. The status update is written in the Italian language, which the language determination module 191 identifies based on the status update. In another embodiment, the language determination module 191 identifies the language based on the location of the user or the language preference listed in the user's profile. In one embodiment, the language determination module 191 decorates the translated social feed with a graphic indicating that the social feed is translated from a first language to one or more second languages.

The storage device 141 stores one or more of the IP addresses for one or more of the users 125*a*, 125*b*, 125*n*, the expected language preference for various IP addresses and a default language for one or more of the users 125*a*, 125*b*, 125*n*. In one embodiment, the IP address for the first user 125*a* indicates that the first user 125*a* is geographically located in the United States and therefore likely to speak the English language. The language determination module 191 retrieves the IP address, determines that the first user 125*a* is likely to speak the English language. The language determination module 191 communicates with the social network application 195 and translates the social feed data before it is sent to the first client 115*a* and displayed on the browser 177 or the display application 178 so that the second user's 125*b* status update is displayed in the English language and not in the Italian language. In another embodiment, the first user's IP address indicates that the first user 125*a* is geographically located in Mexico and so, the language determination module 191 communicates with the social network application 195 so that the second user's 125*b* status update is displayed in the Spanish language.

In yet another embodiment, the language determination module 191 retrieves data from the storage device 141 indicating that one or more of the users 125*a*, 125*b*, 125*n* that the first user 125*a* is in a relationship with (e.g., a friend, a family member, a co-worker, etc.) communicate in the English language. For example, one or more of the first user's 125*a* friends have the English language set as their default language. In another example, the language determination module 191 includes code and routines to parse the activities of the first user's 125*a* friends and determine based at least in part on these activities that one or more of the first user's 125*a* friends communicate in the English language. The language determination module 191 communicates with the social network application 195 to deliver social feed data to the client 115*a* that causes the browser 177 or the display application 178 to display the second user's 125*b* status update in the English language. The language determination module 191 is described in more detail with reference to FIG. 5.

In one embodiment, the language determination module 191 translates the social feed data based on the identity of the user 125*a*, 125*b*, 125*n*. For example, the user 125*a*, 125*b*, 125*n* saves information in the user's profile indicating that the user is a speaker of a specific language or prefers to communicate using a specific language and the language determination module 191 translates the social feed data based at least in part on this information.

The translation server 107 is a hardware server device. For example, the translation server 107 is a hardware server operated by Google® of Mountain View, Calif. In one embodiment, the translation server 107 sends and receives data to and from one or more of the social network server 101 and one or more of the client devices 115*a*, 115*b*, 115*n* via the network 105. For example, the translation server 107 is a hardware server that provides the Google® Translate service to the client device 115*a*, 115*b*, 115*n*.

The translation server 107 comprises a translation module 193 and a storage device 143. The translation module 193 comprises code and routines configured to receive social feed data from the social network application 195 encoded so that the social feed is in a first language. The translation module 193 is stored in a memory (not pictured) of the translation server 107, and when executed by a processor (not pictured) of the translation server 107, the translation module 193 translates the social feed data so that the social feed is in a second language. The storage device 143 is a non-transitory computer-readable memory that stores data and/or information necessary for the translation module 193 to perform its function.

In one embodiment, the client device 115*a*, 115*b*, 115*n* communicates with the social network application 195 via the network 105 to request social feed data from the social network application 195. The social network application 195 communicates with the client device 115*a*, 115*b*, 115*n* via the network 105 to deliver the social feed data to the client device 115*a*, 115*b*, 115*n*. The social feed data causes the client device 115*a*, 115*b*, 115*n* to display a social feed in a first language. The user 125*a* provides an input to the client device 115*a*, 115*b*, 115*n* requesting the social feed be displayed in a second language. The client device 115*a*, 115*b*, 115*n* communicates with the social network application 195 to request that the social feed be displayed in a second language. The social network application 195 communicates with the translation module 193 to send the social feed data and an indication of the requested second language to the translation module 193. The translation module 193 is executed by a processor (not pictured) of the translation server 107 to cause the processor to translate the social feed data to the requested second language based at least in part on data stored in the storage device 143. In one embodiment, the translation module 193 translates the social feed data using any form of machine translation (e.g., rule-based, statistical, example-based, hybrid machine translation, etc.). The translation module 193 communicates with the client device 115*a* via the network 105 to deliver the translated social feed data to the client device 115*a*. The translated social feed data causes the client device 115*a* to display the social feed in the requested second language. The translation module 193 and the storage device 143 are described in more detail below with reference to FIG. 2.

The client device 115*a*, 115*b*, 115*n* is any computing device. For example the client device 115*a*, 115*b*, 115*n* is a personal computer ("PC"), smart phone, tablet computer (or tablet PC), etc. One having ordinary skill in the art will recognize that other types of client devices 115*a*, 115*b*, 115*n* are possible. In one embodiment, the system 100 comprises a combination of different types of client devices 115*a*, 115*b*, 115*n*. For example, a first client device 115*a* is a smart phone, a second client device 115*b* is a personal computer and a plurality of other client devices 115*n* is any combination of a personal computer, a smart phone and a tablet computer.

The client device 115*a*, 115*b*, 115*n* comprises a browser 177. The browser 177 is code and routines stored in a non-transitory computer-readable memory of the client device 115*a*, 115*b*, 115*n* and is executed by a processor (not pictured) of the client device 115*a*, 115*b*, 115*n* for displaying data retrieved via the network 105. For example, the browser 177 is a browser application such as Google® Chrome. In one embodiment, the browser 177 comprises a memory for storing data, code and/or routines.

In one embodiment, the client device 115*a*, 115*b*, 115*n* is a mobile device, such as a smart phone, that includes a display application 178. The display application 178 is code and routines stored in a non-transitory computer-readable memory of the client device 115a, 115b, 115n and is executed by a processor (not pictured) of the client device 115a, 115b, 115n. In one embodiment, the display application 178 is a thin client that relies on the browser 177 to retrieve information from the network 105 and generates a display on the client device 115a, 115b, 115n. In one example, the display application 178 is an application dedicated to displaying only information received from the social network server 101. Persons of ordinary skill in the art will recognize that references to the client device 115a, 115b, 115n performing steps such as receiving data and displaying data can be references to the browser 177 or the display application 178, or a combination of the browser 177 and the display application performing those steps.

Translation Module

Figure 2:
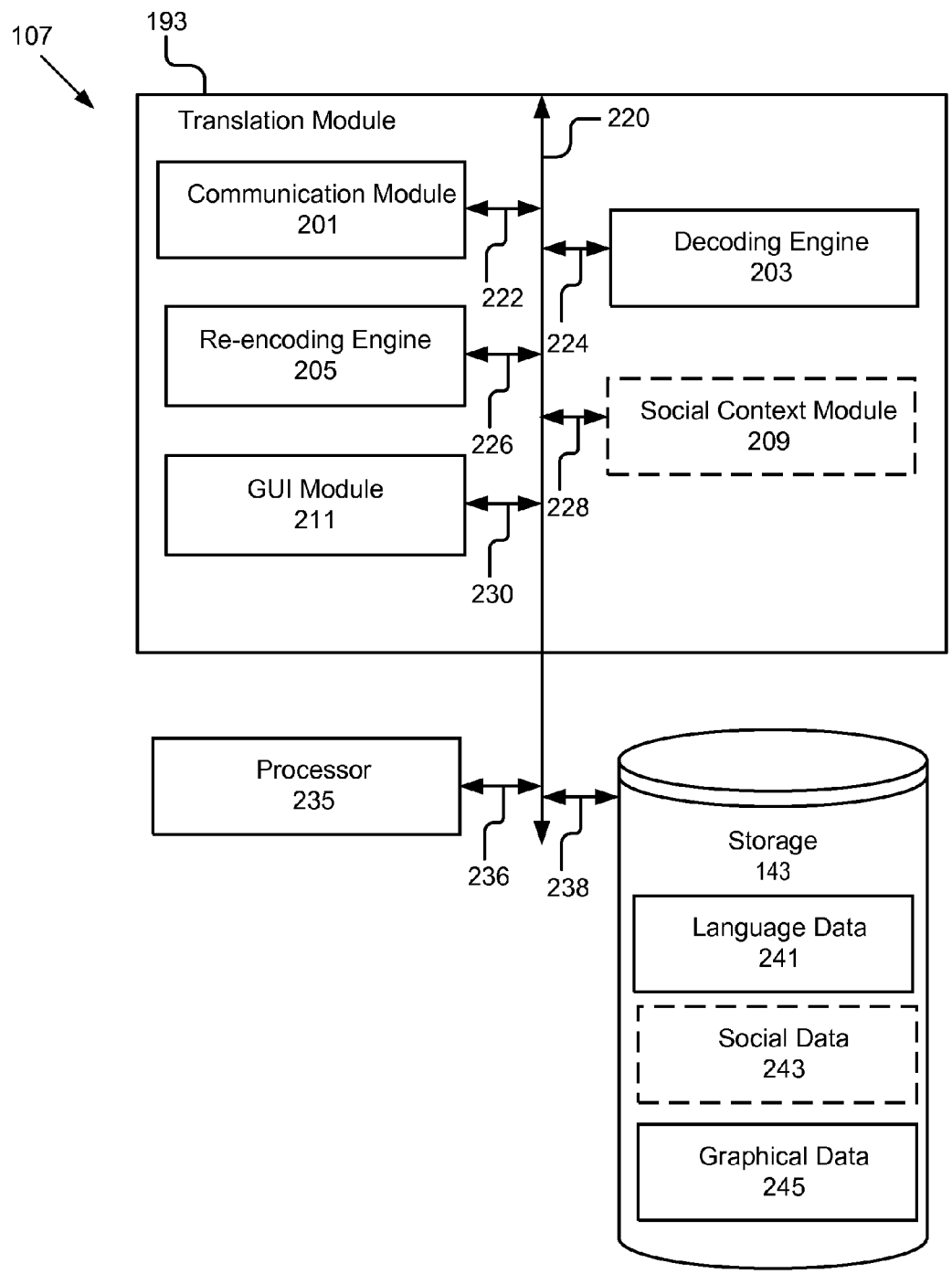
FIG. 2 is a block diagram illustrating one embodiment of a translation module.

Referring now to FIG. 2, the translation module 193 is shown in more detail. FIG. 2 is a block diagram of the translation server 107 that includes the translation module 193, a processor 235 and the storage device 143. The processor 235 comprises an arithmetic logic unit, a microprocessor, a general purpose controller or some other processor array to perform computations, execute the modules 201, 209, 211 and the engines 203, 205. The processor 235 is coupled to the bus 220 for communication with the other components. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible. The processor 235 is communicatively coupled to the bus 220 via signal line 236.

The storage device 143 stores instructions and/or data that may be executed by the processor 235. For example, the storage device 143 stores language data 241 and graphical data 245. In one embodiment, the storage 143 stores social data 243, which includes user interactions, a social graph, etc. The storage device 143 is communicatively coupled by the bus 220 for communication with the other components of the translation server 107. The storage device 143 is a database, dynamic random access memory (DRAM) device, a static random access memory (SRAM) device, flash memory or any other memory device known in the art. In one embodiment, the storage device 143 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other non-volatile storage device known in the art. The storage device 143 is communicatively coupled to the bus 220 via signal line 238. In one embodiment, the storage device 143 stores other components.

The language data 241 is data necessary for the decoding engine 203 and the re-encoding engine 205 to perform their functions. For example, the language data 241 comprises data necessary for the decoding engine 203 and/or the re-encoding engine 205 to perform one or more of rule-based, statistical, example-based and hybrid machine translation of the social feed data from a first language to one or more second languages. In one embodiment, the language data 241 comprises one or more of the following: one or more linguistic rules; one or more lexicons with morphological, syntactic, and semantic information; a corpus of data necessary for statistical translation; one or more dictionary entries; a bilingual text corpus; etc.

The graphical data 245 is data used by the Graphical User Interface module 211 ("GUI module 211") to decorate the translated social feed with a graphic indicating that the social feed is translated from a first language to one or more second languages. For example, the translated social feed includes a graphical ribbon along the top of the user interface indicating that the social feed has been translated from a first language to a second language. The GUI module 211 retrieves data from the graphical data 245 necessary to cause the client device 115a, 115b, 115n to decorate the translated social feed with this graphic.

The translation module 193 comprises a communication module 201, the decoding engine 203, the re-encoding engine 205 and the GUI module 211. In one embodiment, the translation module 193 also comprises a social context module 209. The social context module 209 is depicted in FIG. 2 with a dashed line to indicate that the social context module 209 is an optional feature of the translation module 193. The modules 201, 209, 211 and the engines 203, 205 communicate with each other via the bus 220. The communication module 201 is communicatively coupled to the bus 220 via signal line 222. The decoding engine 203 is communicatively coupled to the bus 220 via signal line 224. The re-encoding engine 205 is communicatively coupled to the bus 220 via signal line 226. The social context module 209 is communicatively coupled to the bus 220 via signal line 228. The GUI module 211 is communicatively coupled to the bus 220 via signal line 230.

The communication module 201 is code and routines for communicating with one or more of the client devices 115a, 115b, 115n and the social network server 101 via the network 105. In one embodiment, the communication module 201 communicates with the social network server 101 via the network 105 to receive at least a portion of the data necessary for the translation module 193 to perform its function. For example, in one embodiment the communication module 201 communicates with the social network application 195 to receive from the social network application 195 one or more of the social feed data, an identifier of the user 125a, 125b, 125n and an indication of the one or more second languages requested by the user 125a, 125b, 125n (i.e., which languages the user 125a, 125b, 125n has requested the social feed be translated to). The communication module 201 communicates with the client device 115a, 115b, 115n via the network 105 to send the translated social feed data to the client device 115a, 115b, 115n. In one embodiment, the translated social feed data includes the graphical data necessary to cause the client device 115a, 115b, 115n to display the graphic indicating that the social feed has been translated from a first language to one or more second languages. In one embodiment, the communication module 201 manages communications among the modules 209, 211 and the engines 203, 205.

The decoding engine 203 is code and routines for decoding the social feed data in accordance with any form of machine translation (rule-based, statistical, example-based, hybrid machine translation, etc.). The decoding engine 203 is communicatively coupled to the communication module 201 to receive the social feed data from the communication module 201. The decoding engine 203 is communicatively coupled to the storage device 143 to retrieve at least a portion of the language data 241 necessary to decode the social feed. In one embodiment, the decoding engine 203 includes a parser.

The re-encoding engine 205 is code and routines for re-encoding the social feed data in accordance with any form of machine translation (rule-based, statistical, example-based, hybrid machine translation, etc.) from the first language to one or more second languages. The re-encoding engine 205 is communicatively coupled to the communication module 201 to receive the indication of the one or more second languages from the communication module 201. The re-encoding engine 205 is communicatively coupled to the decoding engine 203 to receive the decoded social feed data from the decoding engine 203. The re-encoding engine 205 is communicatively coupled to the storage device 143 to retrieve at least a portion of the language data 241 necessary to re-encode the decoded social feed data to the one or more second languages.

The output of the re-encoding engine 205 is the translated social feed data. The translated social feed data is configured to cause the client device 115*a*, 115*b*, 115*n* to display the translated social feed. The translated social feed is the social feed translated from a first language to one or more second languages. In one embodiment, the GUI module 211 communicates with the re-encoding engine 205 to cause the translated social feed data to include graphical data that causes the client device 115*a*, 115*b*, 115*n* to display a graphic in the translated social feed indicating that the social feed is translated from a first language to one or more second languages. The decoding engine 203 communicates with the communication module 201 to send the translated social feed data to the re-encoding engine 205.

In one embodiment, it is desirable to translate only a portion of the social feed data. For example, translating only a portion of the social feed data beneficially enables the translation module 193 to perform its function in less time and serve the translated social feed data to the client device 115*a*, 115*b*, 115*n* quicker than if the translation module 193 translated the entire social feed. For example, the user 125*a*, 125*b*, 125*n* specifies that only a portion of the social feed should be translated from a first language to one or more second languages. In one embodiment, the social network application 195 receives from the client device 115*a*, 115*b*, 115*n* an indication that only a portion of the social feed should be translated and an indication of which portion should be translated. These indications are referred to herein as "the subset command." The social network application 195 receives the subset command from the client device 115*a*, 115*b*, 115*n* and communicates with the translation module 193 to send the subset command to the translation module 193. The components of the translation module 193 then take steps necessary to translate only the portions of the social feed data specified by the subset command. Thus, in one embodiment, the decoding engine 203 and the re-encoding engine 205 are configured to translate a portion of the social feed from a first language to one or more second languages based at least in part on the subset command. In one embodiment, the re-encoding engine 205 is configured to translate a first portion of the social feed to one language and a second portion to a different language.

The social context module 209 is code and routines that determines one or more portions of the social feed to be translated by the other components of the translation module 193. For example, assume that the translation module 193 is configured to only translate portions of the social feed that have an activity by the user 125*a*, 125*b*, 125*n* (e.g., the translation module 193 only translates the portion of the social feed that have been commented on by the first user 125*a* that requested the translation). The social context module 209 communicates with the communication module 201 and receives from the communication module 201 the social feed data and an identifier of the user 125*a*, 125*b*, 125*n* requesting the translation. The identifier of the user 125*a*, 125*b*, 125*n* requesting the translation is the screen name of the user 125*a*, 125*b*, 125*n* or any other information present in the social feed data that identifies the user 125*a*, 125*b*, 125*n* requesting the translation. The social context module 209 analyzes the social feed data or the portion of the social feed data to determine which portions of the social feed have been acted on by the user 125*a*, 125*b*, 125*n* requesting the translation. For example, the social context module 209 includes a parser that is configured to parse the social data 243 and identify a portion of the social feed that has been acted on by the user 125*a* 125*b*, 125*n* requesting the translation. In one embodiment, the social context module 209 analyses the social feed data based at least in part on the identifier of the user 125*a*, 125*b*, 125*n* requesting the translation. For example, the social context module 209 parses the social feed data based at least in part on the identifier of the user 125*a*, 125*b*, 125*n* requesting the translation. The social context module 209 communicates with the decoding engine 203 and/or the re-encoding engine 205 to translate the portions of the social feed acted on by the user 125*a*, 125*b*, 125*n* requesting the translation.

In another embodiment, the social feed data includes data indicating a relationship with the user 125*a*, 125*b*, 125*n* requesting the translation and the social context module 209 works with the other components of the translation module 193 to translate the social feed data based at least in part on the data indicating the relationship. In one embodiment, a second user 125*a*, 125*b*, 125*n* has a relationship with a first user 125*a*, 125*b*, 125*n* requesting the translation if the two users 125*a*, 125*b*, 125*n* are friends, family members, co-workers, friends of friends, etc. Such users 125*a*, 125*b*, 125*n* are referred to herein as "relations." For example, the user 125*a*, 125*b*, 125*n* requesting the translation specifies that they only want portions of the social feed that have been acted on by a family member to be translated. This preference of the user 125*a*, 125*b*, 125*n* requesting the translation is communicated to the social network application 195 by the client device 115*a*, 115*b*, 115*n* and the social network application 195 communicates this request to the translation module 193. The communication module 201 communicates this request to the social context module 209. The social context module 209 analyses the social feed data to determine the one or more relationships of the user 125*a*, 125*b*, 125*n* requesting the translation and to determine which portions of the social feed data should be translated. For example, the social context module 209 parses the social feed data based at least in part on one or more relationships of the user 125*a*, 125*b*, 125*n* requesting the translation. In one embodiment, the relationships are stored as social data 243, for example, as a social graph. The social context module 209 determines which portions of the social feed data should be translated based at least in part on this parsing. The social context module 209 communicates with the decoding engine 203 and/or the re-encoding engine 205 to translate the portions of the social feed acted on by one or more users 125*a*, 125*b*, 125*n* having a relationship with the user 125*a*, 125*b*, 125*n* requesting the translation.

In yet another embodiment, the user 125*a*, 125*b*, 125*n* requesting the translation requests that the translation module 193 translates only portions of the social feed data that are acted on by one or more users 125*a*, 125*b*, 125*n* specified by the user 125*a*, 125*b*, 125*n* requesting the translation. The social context module 209 takes steps necessary to accommodate this request similar to those as described above for relationships. The above described functions performed by the social context module 209 are referred to herein as "determining a social context for the translation."

The GUI module 211 is code and routines that retrieves the graphical data 245 or a portion of the graphical data 245 from the storage 143 and uses this data to determine and include in the translated social feed data the graphical data necessary to decorate the social feed data with graphic indicating that the social feed has been translated from a first language to one or more second languages.

Methods

Figure 3:
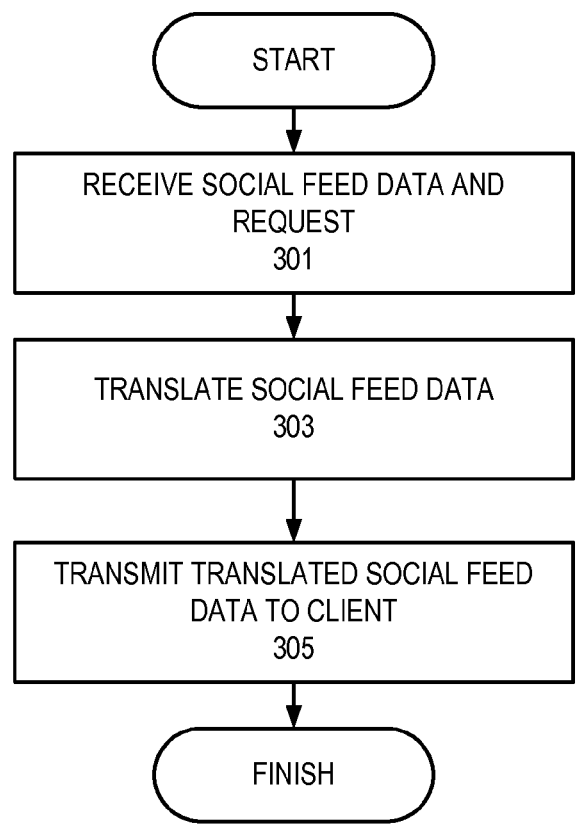
FIG. 3 is a flow diagram of one embodiment of a method for translating a feed for a social network.
Figure 4:
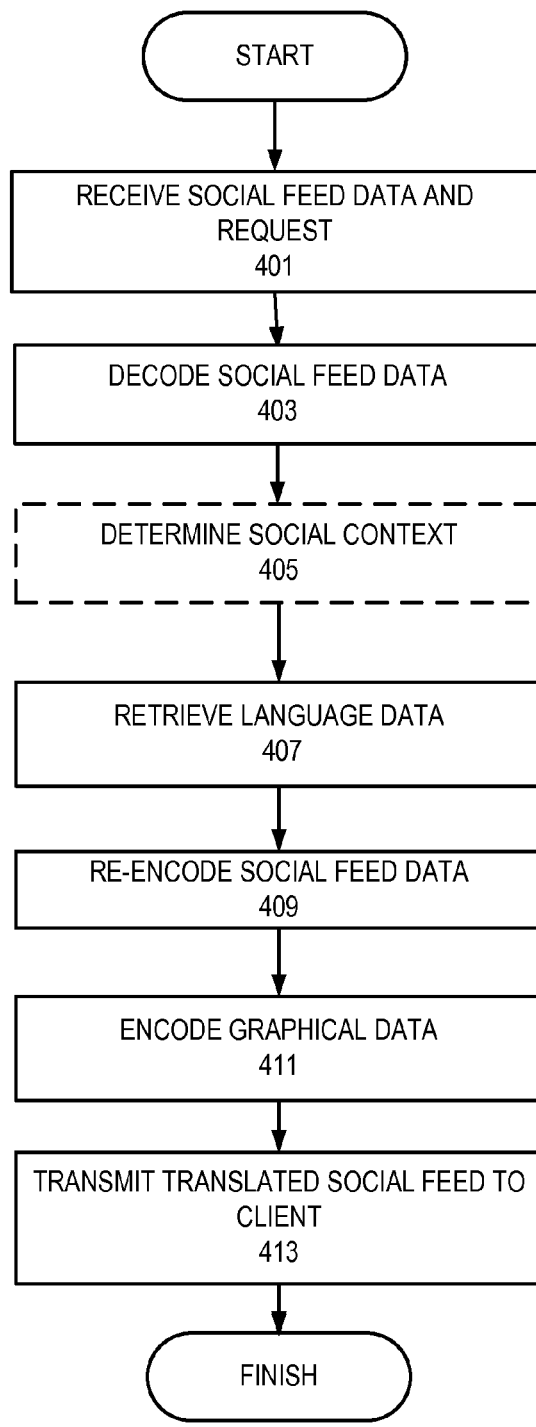
FIG. 4 is a flow diagram of another embodiment of a method for translating a feed for a social network.
Figure 5:
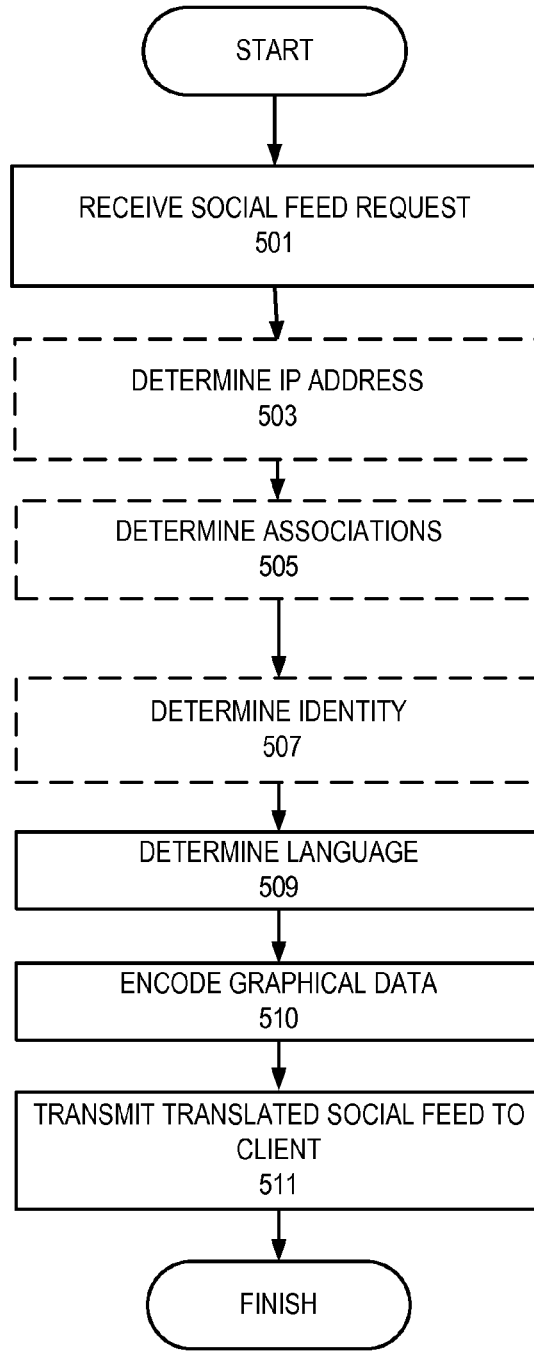
FIG. 5 is a flow diagram of yet another embodiment of a method for translating a feed for a social network.

Referring now to FIGS. 3-5, various example embodiments will be described. FIG. 3 is a flow diagram of one embodiment of a method 300 for translating a feed for a social network. The translation module 193 receives 301 the social feed data and a request for translation from the social network application 195. The request includes one or more of an indication of the one or more second languages, the identity of the user 125a, 125b, 125n requesting the translation and a subset command. The translation module 193 translates 303 the social feed data based at least in part on the request. The translation module 193 transmits 305 the translated social feed data to the browser 177 or the display application 178 stored on the client 115a, 115b, 115n.

FIG. 4 is a flow diagram of another embodiment of a method 400 for translating a feed for a social network. The communication module 201 receives 401 the social feed data and the request. The decoding engine 203 decodes 403 the social feed data. In one embodiment, decoding 403 the social feed data includes retrieving necessary language data 241 from the storage device 143. Optionally, the social context module 209 communicates with the decoding engine 203 to determine 405 the social context for the translation. The re-encoding engine 205 re-encodes 409 the decoded social feed data. Optionally, the re-encoding engine 205 re-encodes 409 the decoded social feed data based at least in part on communications with the social context module 209. In one embodiment, re-encoding 409 the social feed data includes retrieving 407 necessary language data 241 from the storage device 143. The GUI module 211 determines graphical data to include in the translated social feed data. The GUI module 211 communicates with the re-encode engine 205 to encode 411 the graphical data in the translated social feed data. The communication module 201 transmits 413 the translated social feed data to the browser 177 or the display application 178 stored on the client device 115a, 115b, 115n.

In one embodiment, the methods 300 and 400 are modified so that the translation module 193 translates the social feed data without the social network application 195 receiving a request from the client device 115a, 115b, 115n that the social feed be translated from a first language to one or more second languages. For example, the social network application 195 is configured to send the social feed data and the request to the translation module 193 via the network 105 automatically. The client device 115a, 115b, 115n requests social content from the social network application 195. For example, the first user 125a uses the browser 177 or the display application 178 stored on the client device 115a, 115b, 115n to load a website providing the Google® Buzz service. The social network application 195 communicates with the translation module 193 so that the social feed data is transmitted first to the translation module 193. The translation module 193 translates the social feed similar to method 300. For example, the social feed data includes an identifier of the user 125a, 125b, 125n using the client device 115a, 115b, 115n to access the social network. The social context module 209 parses the social feed data to determine which language the user 125a, 125b, 125n usually communicates with or the language of the user's 125a, 125b, 125n relations. The social context module 209 communicates with the decoding engine 203 and the re-encoding engine 205 so that the social feed data is translated based at least in part on the language that the user 125a, 125b, 125n communicates with and/or the language of the user's 125a, 125b, 125n relations.

FIG. 5 is a flow diagram of another embodiment of a method 500 for translating a feed for a social network. The language determination module 191 receives 501a request to translate the social feed data. The language determination module 191 translates the social feed data based at least in part on one or more of an IP address for the client device 115a, 115b, 115n whose browser 177 or display application 178 is requesting the social feed data, one or more relations of the user 125a, 125b, 125n of the client device 115a, 115b, 115n whose browser 177 or display application 178 is requesting the social feed data and the identity of the user 125a, 125b, 125n of the client device 115a, 115b, 115n whose browser 177 or display application 178 is requesting the social feed data.

Steps 503, 505 and 507 are depicted in FIG. 5 with a dashed line to indicate that they are optional features of the method 500. At step 503 the language determination module 191 determines the IP address for the client device 115a, 115b, 115n whose browser 177 or display application 178 is requesting the social feed data. At step 505 the language determination module 191 determines one or more relations for the user 125a, 125b, 125n of the client device 115a, 115b, 115n whose browser 177 or display application 178 is requesting the social feed data. At step 507, the language determination module 191 determines the identity of the users 125a, 125b, 125n of the client device 115a, 115b, 115n whose browser 177 or display application 178 is requesting the social feed data.

The language determination module 191 determines 509 one or more languages to translate the social feed data to based at least in part on one or more of the IP address, the relations and the identity determined in steps 503, 505 and 507. The language determination module 191 translates the social feed data based at least in part on the one or more determined languages. The language determination module 191 encodes 510 graphical data in the translated social feed data. The language determination module 191 transmits 511 the translated social feed data to the browser 177 or the display application 178 of the client device 115a, 115b, 115n that requested the social feed data.

The foregoing description of the example embodiments of the specification has been presented for the purposes of illustration and description. It is not intended to be exhaustive or to limit the disclosure to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the disclosure or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method for translating a first social feed, the method comprising:
   receiving, with a processor, social feed data and a request from a first user for a translation, the social feed data configured to cause a client to display the first social feed in a first language;
   determining, with the processor, a social context for the translation, the social context including which relationships are associated with the social feed data using a social graph, wherein the social graph comprises relationships between the first user and at least one second user;
   receiving, with the processor, a user input from the first user specifying a particular relationship for which the social feed data should be translated;
   determining, with the processor, a relationship between the first user and the second user based at least in part on the social context for the translation and whether the relationship matches the particular relationship specified by the user input;
   determining, with the processor, a first portion of the first social feed for translation based at least in part on whether the relationship between the first user and the second user matches the particular relationship, the first portion including one or more portions of the social feed data associated with the second user;
   translating, with the processor, the social feed data that is associated with the first portion of the first social feed so that the translated social feed data causes the client to display the first portion translated into one or more second languages based at least in part on the request and the social context; and
   transmitting, with the processor, the translated social feed data to the client for the first user to view.

2. The method of claim 1, further comprising:
   identifying a second portion of the first social feed that is associated with a third user, the third user having a different relationship with the first user than the particular relationship; and
   excluding the second portion from translation based at least in part on the different relationship.

3. The method of claim 1, wherein the request is a subset command that includes a first indication that only the first portion of the first social feed should be translated and a second indication of what language the first social feed should be translated into.

4. The method of claim 1, wherein the social feed data is a description of all onsite activities on a social network.

5. The method of claim 1, wherein determining the social context for the translation includes determining one or more social activities of the first user requesting the translation and a language used by the first user in the one or more social activities.

6. The method of claim 2, wherein the particular relationship between the first user and the second user in the social graph is closer than the different relationship between the first user and the third user in the social graph.

7. The method of claim 1, further comprising encoding graphical data in the social feed data that causes the client to generate a graphic indicating that the first social feed has been translated.

8. A computer program product comprising a non-transitory computer readable medium storing a computer readable program, wherein the computer readable program when executed on a computer causes the computer to perform steps comprising:
   receiving social feed data and a request from a first user for a translation, the social feed data configured to cause a client to display a first social feed in a first language;
   determining a social context for the translation, the social context including which relationships are associated with the social feed data using a social graph, wherein the social graph comprises relationships between the first user and at least one second user;
   receiving a user input from the first user specifying a particular relationship for which the social feed data should be translated;
   determining a relationship between the first user and the second user based at least in part on the social context for the translation and whether the relationship matches the particular relationship specified by the user input;
   determining a first portion of the first social feed for translation based at least in part on whether the relationship between the first user and the second user matches the particular relationship, the first portion including one or more portions of the social feed data associated with the second user;
   translating the social feed data that is associated with the first portion of the first social feed so that the translated social feed data causes the client to display the first portion translated into one or more second languages based at least in part on the request and the social context; and
   transmitting the translated social feed data to the client for the first user to view.

9. The computer program product of claim 8 further comprising:
   identifying a second portion of the first social feed that is associated with a third user, the third user having a different relationship with the first user than the particular relationship; and
   excluding the second portion from translation based at least in part on the different relationship.

10. The computer program product of claim 8, wherein the request is a subset command that includes a first indication that only the first portion of the first social feed should be translated and a second indication of what language the first social feed should be translated into.

11. The computer program product of claim 8, wherein the social feed data is a description of all onsite activities on a social network.

12. The computer program product of claim 8, wherein determining the social context for the translation includes determining one or more social activities of the first user requesting the translation and a language used by the first user in the one or more social activities.

13. The computer program product of claim 9, wherein the particular relationship between the first user and the second user in the social graph is closer than the different relationship between the first user and the third user in the social graph.

14. A system for translating a first social feed, the system comprising:
   a communication module communicatively coupled to a social network application via a network to receive social feed data configured to cause a client to display the first social feed in a first language and a request from a first user for a translation from the social network application requesting that a first portion of the first social feed be displayed in one or more second languages;

a decoding engine communicatively coupled to the communication module to receive the social feed data from the communication module, the decoding engine configured to decode the social feed data to generate decoded social feed data;

a social context module communicatively coupled to the communication module to receive the social feed data, to determine a social context for the translation, the social context including which relationships are associated with the social feed data using a social graph, wherein the social graph comprises relationships between the first user and at least one second user, to receive a user input from the first user specifying a particular relationship for which the social feed data should be translated, to determine a relationship between the first user and the second user based at least in part on the social context for the translation and whether the relationship matches the particular relationship specified by the user input and to determine the first portion of the first social feed for translation based at least in part on whether the relationship between the first user and the second user matches the particular relationship, the first portion including one or more portions of the social feed data associated with the second user; and a re-encoding engine communicatively coupled to the communication module, the decoding engine and the social context module to receive the request from the communication module, the decoded social feed data from the decoding engine and the social context from the social context module, the re-encoding engine configured to re-encode the decoded social feed data that is associated with the first portion of the first social feed to cause the client to display the first portion translated into the one or more second languages based at least in part on the request and the social context, wherein the communication module is further configured to transmit the translated social feed data to the client for the first user to view.

15. The system of claim 14, wherein the social context module identifies a second portion of the first social feed that is associated with a third user, the third user having a different relationship with the first user than the particular relationship; and wherein the re-encoding engine excludes the second portion from translation based at least in part on the different relationship.

16. The system of claim 14, wherein the request is a subset command that includes a first indication that only the first portion of the first social feed should be translated and a second indication of what language the first social feed should be translated into.

17. The system of claim 14, wherein the social feed data is a description of all onsite activities on a social network.

18. The system of claim 14, wherein determining the social context for the translation includes determining one or more social activities of the first user requesting the translation and a language used by the first user in the one or more social activities.

19. The system of claim 15, wherein the particular relationship between the first user and the second user in the social graph is closer than the different relationship between the first user and the third user.

20. The system of claim 14, further comprising a graphical user interface module communicatively coupled to the re-encoding engine to encode graphical data in the social feed data that causes the client to generate a graphic indicating that the first social feed has been translated.

21. The method of claim 1, further comprising parsing, with the processor, the social feed data to determine which language the first user usually communicates with and wherein the translating includes translating the social feed data to the language that the first user usually communicates with.

22. The method of claim 1, further comprising parsing, with the processor, the social feed data to determine a language used by other users that are related to the first user in the social graph and wherein the translating includes translating the social feed data to the language used by the other users.

23. The computer program product of claim 8, further comprising parsing the social feed data to determine which language the first user usually communicates with and wherein the translating includes translating the social feed data to the language that the first user usually communicates with.

24. The computer program product of claim 8, further comprising parsing, with the processor, the social feed data to determine a language used by other users that are related to the first user in the social graph and wherein the translating includes translating the social feed data to the language used by the other users.

25. The system of claim 14, wherein the social context module parses the social feed data to determine which language the first user usually communicates with and wherein the re-encoding engine translates the social feed data to the language that the first user usually communicates with.

26. The system of claim 14, wherein the social context module parses the social feed data to determine a language used by other users that are related to the first user in the social graph and wherein the re-encoding engine translates the social feed data to the language used by the other users.

* * * * *